(12) United States Patent
Taniguchi et al.

(10) Patent No.: US 12,153,731 B2
(45) Date of Patent: Nov. 26, 2024

(54) APPARATUS AND METHOD FOR OBTAINING FACIAL INFORMATION

(71) Applicant: TOYOTA JIDOSHA KABUSHIKI KAISHA, Toyota (JP)

(72) Inventors: Satoru Taniguchi, Nagoya (JP); Shunichiroh Sawai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/406,311

(22) Filed: Aug. 19, 2021

(65) Prior Publication Data
US 2022/0066551 A1    Mar. 3, 2022

(30) Foreign Application Priority Data
Aug. 26, 2020 (JP) .................. 2020-142607

(51) Int. Cl.
| | |
|---|---|
| *G06F 3/01* | (2006.01) |
| *B60K 35/00* | (2024.01) |
| *G06K 9/00* | (2022.01) |
| *G06V 20/59* | (2022.01) |
| *G06V 40/16* | (2022.01) |
| *B60K 35/10* | (2024.01) |
| *B60K 35/22* | (2024.01) |

(52) U.S. Cl.
CPC .............. *G06F 3/013* (2013.01); *B60K 35/00* (2013.01); *G06V 20/597* (2022.01); *G06V 40/166* (2022.01); *G06V 40/176* (2022.01); *B60K 35/10* (2024.01); *B60K 35/22* (2024.01); *B60K 2360/149* (2024.01); *G06F 2203/011* (2013.01)

(58) Field of Classification Search
CPC . G06F 3/013; G06F 2203/011; G06V 20/597; G06V 40/176; G06V 40/166; B60K 35/00; B60K 2370/149; B60K 2370/152
See application file for complete search history.

(56) References Cited

U.S. PATENT DOCUMENTS

| | | | |
|---|---|---|---|
| 10,108,260 B2 * | 10/2018 | Park ....................... | G06V 10/60 |
| 2007/0222947 A1 | 9/2007 | Kimata et al. | |
| 2014/0226131 A1 * | 8/2014 | Lopez ..................... | G06F 21/36 |
| | | | 351/210 |
| 2014/0361996 A1 * | 12/2014 | Eden ....................... | G06F 3/013 |
| | | | 345/173 |
| 2014/0369571 A1 | 12/2014 | Tsukizawa et al. | |
| 2016/0342205 A1 * | 11/2016 | Shigeta ................ | G06V 40/193 |
| 2017/0286771 A1 * | 10/2017 | Ishii ..................... | A61B 3/0025 |

(Continued)

FOREIGN PATENT DOCUMENTS

| | | |
|---|---|---|
| CN | 103890811 A | 6/2014 |
| CN | 106028913 A | 10/2016 |

(Continued)

*Primary Examiner* — Lixi C Simpson
(74) *Attorney, Agent, or Firm* — Dickinson Wright, PLLC

(57) ABSTRACT

An apparatus for obtaining facial information obtains facial information indicating the state of the face of a driver of a vehicle from each of face images of the driver's face, causes a display mounted on the vehicle to show a screen including an input section for receiving input of information from the driver, and obtains correction information for correcting the facial information from a face image, of the face images, generated while the screen is displayed on the display.

6 Claims, 4 Drawing Sheets

(56) References Cited

U.S. PATENT DOCUMENTS

| | | | |
|---|---|---|---|
| 2018/0032131 A1 | 2/2018 | Yasuda et al. | |
| 2018/0134217 A1* | 5/2018 | Peterson | G06V 20/58 |
| 2019/0318181 A1* | 10/2019 | Katz | B60W 40/09 |
| 2020/0033600 A1* | 1/2020 | Kweon | G02B 27/283 |
| 2020/0134672 A1* | 4/2020 | el Kaliouby | G06V 40/162 |

FOREIGN PATENT DOCUMENTS

| | | |
|---|---|---|
| CN | 107407977 A | 11/2017 |
| JP | 2007259931 A | 10/2007 |
| JP | 2013125307 A | 6/2013 |
| JP | 2014178920 A | 9/2014 |
| WO | 2015/125243 A1 | 8/2015 |
| WO | 2016/139850 A1 | 9/2016 |

* cited by examiner

APPARATUS AND METHOD FOR OBTAINING FACIAL INFORMATION

FIELD

The present disclosure relates to an apparatus and a method for obtaining facial information of a vehicle driver.

BACKGROUND

Techniques are known to infer driver's feelings, based on a face image of the driver obtained by a driver monitoring camera mounted in the interior of a vehicle. A travel controller of a vehicle can change motion of the vehicle, depending on the inferred driver's feelings.

To appropriately infer driver's feelings, it is preferable to obtain a face image of the driver looking in a predetermined direction. Japanese Unexamined Patent Publication No. 2014-178920 describes a face recognizing system that recognizes the face of a person shown in an image obtained by an image capturing unit, which is provided near an outer edge of a display, at timing when display information for guiding his/her eyes appears near the image capturing unit.

SUMMARY

For a driver, it is annoying and not preferable to display predetermined information on a display to guide the eyes for the purpose of obtaining a face image of the driver looking in a predetermined direction with a driver monitoring camera mounted in the interior of a vehicle.

It is an object of the present disclosure to provide an apparatus that can obtain facial information of a vehicle driver so as not to annoy the driver.

An apparatus for obtaining facial information according to the present disclosure includes a processor configured to obtain facial information indicating the state of the face of a driver of a vehicle from each of face images of the driver's face; cause a display mounted on the vehicle to show a screen including an input section for receiving input of information from the driver; and obtain correction information for correcting the facial information from a face image, of the face images, generated while the screen is displayed on the display.

The processor of the apparatus according to the present disclosure is preferably configured to cause the display to show, as the screen including the input section, a screen in which the input section is disposed at one edge and an opposite edge of the display, and obtain, as the correction information, first correction information from a face image generated while the input section disposed at the one edge of the display is receiving input of information from the driver and second correction information from a face image generated while the input section disposed at the opposite edge of the display is receiving input of information from the driver.

In the apparatus according to the present disclosure, the facial information preferably indicates a looking direction of the driver, and the correction information indicates difference between a looking direction of the driver's right eye and a looking direction of the driver's left eye.

In the apparatus according to the present disclosure, the facial information preferably indicates a looking direction of the driver, and the correction information indicates three-dimensional positions of the driver's eyes.

In the apparatus according to the present disclosure, the facial information preferably indicates an expression of the driver, and the correction information indicates a blank expression of the driver.

A method for obtaining facial information according to the present disclosure includes obtaining facial information indicating the state of the face of a driver of a vehicle from each of face images of the driver's face, causing a display mounted on the vehicle to show a screen including an input section for receiving input of information from the driver, and obtaining correction information for correcting the facial information from a face image, of the face images, generated while the screen is displayed on the display.

The apparatus according to the present disclosure can obtain facial information of a vehicle driver so as not to annoy the driver.

DESCRIPTION OF EMBODIMENTS

Hereinafter, an apparatus that can obtain facial information of a vehicle driver so as not to annoy the driver will be explained in detail with reference to the accompanying drawings. The apparatus obtains facial information indicating the state of the face of a driver of a vehicle from each of face images of the driver's face. The apparatus causes a display mounted on the vehicle to show a screen including an input section for receiving input of information from the driver. The apparatus obtains correction information for correcting the facial information from a face image, of the face images, generated while the screen including the input section is displayed on the display.

Figure 1:
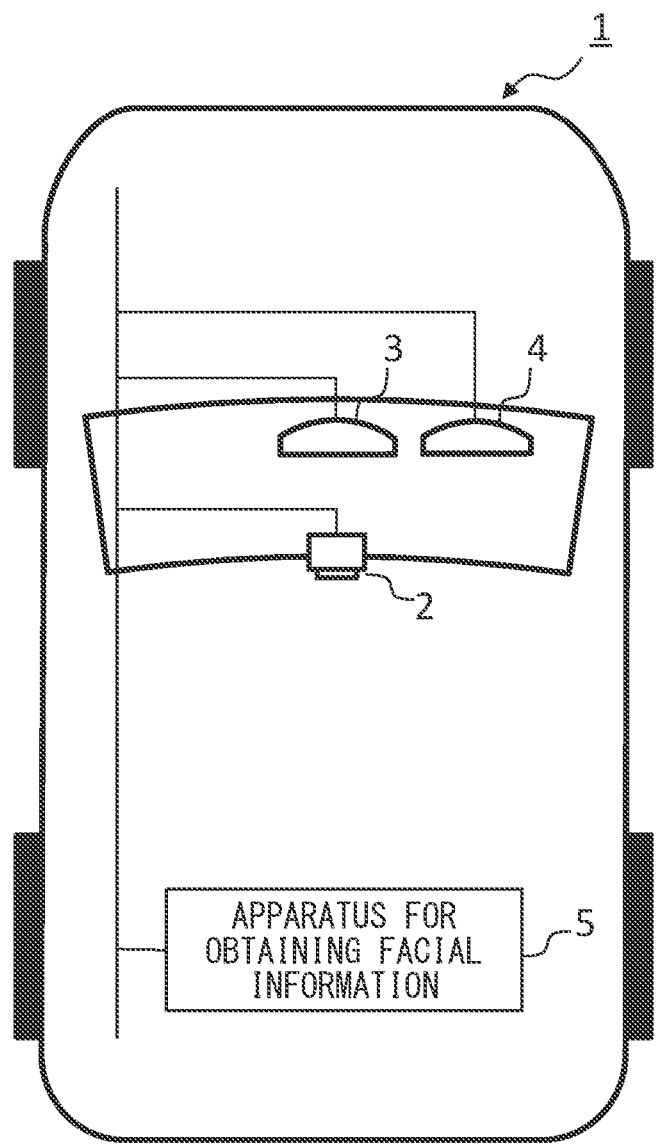
FIG. 1 schematically illustrates the configuration of a vehicle including an apparatus for obtaining facial information.

FIG. 1 schematically illustrates the configuration of a vehicle including an apparatus for obtaining facial information.

The vehicle 1 includes a driver monitoring camera 2, a touch screen display 3, a meter display 4, and an apparatus 5 for obtaining facial information. The driver monitoring camera 2 and the touch screen display 3 are connected to the apparatus 5 via an in-vehicle network conforming to a standard, such as a controller area network, so that they can communicate with each other.

The driver monitoring camera 2 is an example of a sensor for obtaining a face image showing the driver's face. The driver monitoring camera 2 includes a two-dimensional detector constructed from an array of optoelectronic transducers, such as CCD or C-MOS, having sensitivity to infrared light and a focusing optical system focusing an image of a target region on the two-dimensional detector. The driver monitoring camera 2 also includes a light source that emits infrared light. The driver monitoring camera 2 is mounted, for example, in a front and upper area in the interior of the vehicle and oriented toward the face of the driver sitting on the driver's seat. The driver monitoring camera 2 irradiates the driver with infrared light every predetermined capturing period (e.g. ⅓₀ to ⅟₁₀ seconds), and outputs a face image showing the driver's face.

The touch screen display 3, which is an example of a displaying unit, includes a display device, such as a liquid crystal display or an organic electroluminescent display, and displays data for displaying received from the apparatus 5. The touch screen display 3 also includes an input device, such as a capacitive touch sensor, superposed on the display device, and transmits to the apparatus 5 coordinate information depending on operation on the touch screen display 3 by the driver. On the display device, the touch screen display 3 displays a screen including an input section for receiving input of various types of information, such as a destination to search for a travel route, types of spots to search for spots around a current position, and a condition for setting an air conditioner in the interior of the vehicle. Additionally, the touch screen display 3 receives, with the input device, input of information into the input section by the driver. The touch screen display 3 is mounted, for example, near the center of an instrument panel in the interior of the vehicle.

The meter display 4 includes a display device, such as a liquid crystal display or an organic electroluminescent display, and displays travel-related information, such as a travel speed, a travel distance, and various warnings, received from a vehicle controller (not shown). The meter display 4 may also display image information for guiding the driver's eyes, such as a logotype of the vehicle 1. The meter display 4 is mounted on an area in the instrument panel in front of the driver's seat where the driver sits.

The apparatus 5 is an electronic control unit (ECU) including a communication interface, a memory, and a processor. The apparatus 5 causes the touch screen display 3 to show a screen including an input section, and executes a facial-information obtaining process, using face images captured by the driver monitoring camera 2.

Figure 2:
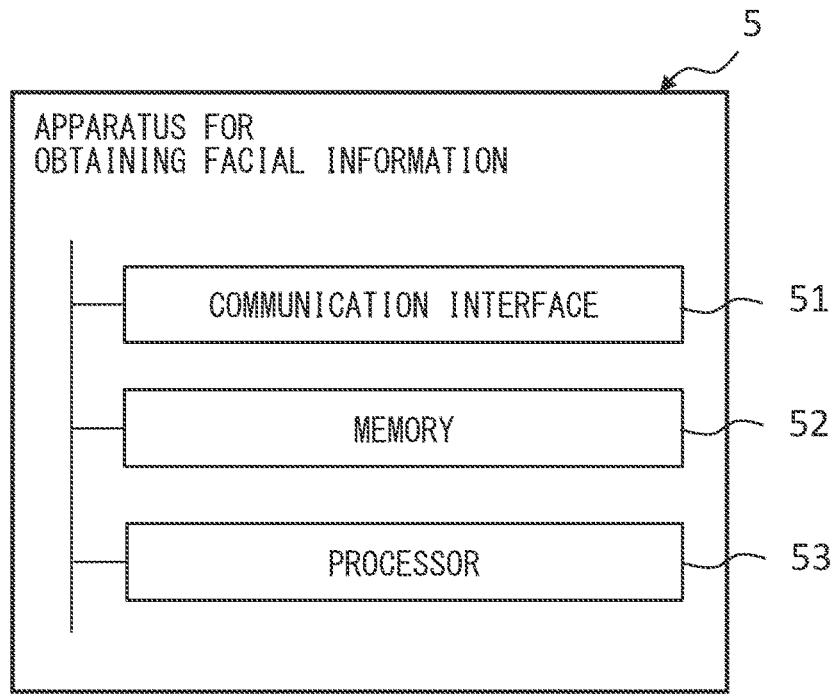
FIG. 2 schematically illustrates the hardware of the apparatus for obtaining facial information.

FIG. 2 schematically illustrates the hardware of the apparatus 5 for obtaining facial information. The apparatus 5 includes a communication interface 51, a memory 52, and a processor 53.

The communication interface 51 is an example of a communication unit, and includes a communication interface for connecting the apparatus 5 to the in-vehicle network. The communication interface 51 provides received data for the processor 53, and outputs data provided from the processor 53 to an external device.

The memory 52 includes volatile and nonvolatile semiconductor memories. The memory 52 stores various types of data used for processing by the processor 53, such as operation parameters for obtaining facial information and correction information from face images and positional information indicating three-dimensional positions of the touch screen display 3 and the meter display 4. The memory 52 also stores various application programs, such as a facial-information obtaining program for executing a facial-information obtaining process.

The processor 53 is an example of a control unit, and includes one or more processors and a peripheral circuit thereof. The processor 53 may further include another operating circuit, such as a logic-arithmetic unit, an arithmetic unit, or a graphics processing unit.

Figure 3:
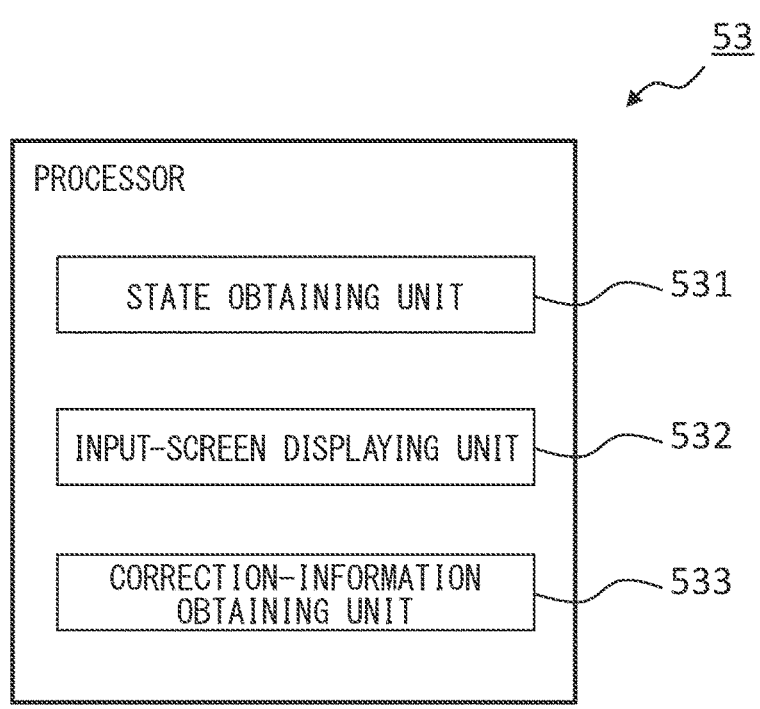
FIG. 3 is a functional block diagram of a processor included in the apparatus for obtaining facial information.

FIG. 3 is a functional block diagram of the processor 53 included in the apparatus 5 for obtaining facial information.

As its functional blocks, the processor 53 of the apparatus 5 includes a state obtaining unit 531, an input-screen displaying unit 532, and a correction-information obtaining unit 533. These units included in the processor 53 are functional modules implemented by a program executed on the processor 53, or may be implemented in the apparatus 5 as separate integrated circuits, microprocessors, or firmware.

The state obtaining unit 531 receives face images generated by the driver monitoring camera 2 via the communication interface 51. The state obtaining unit 531 obtains facial information of the driver from each of the received face images.

Figure 4:
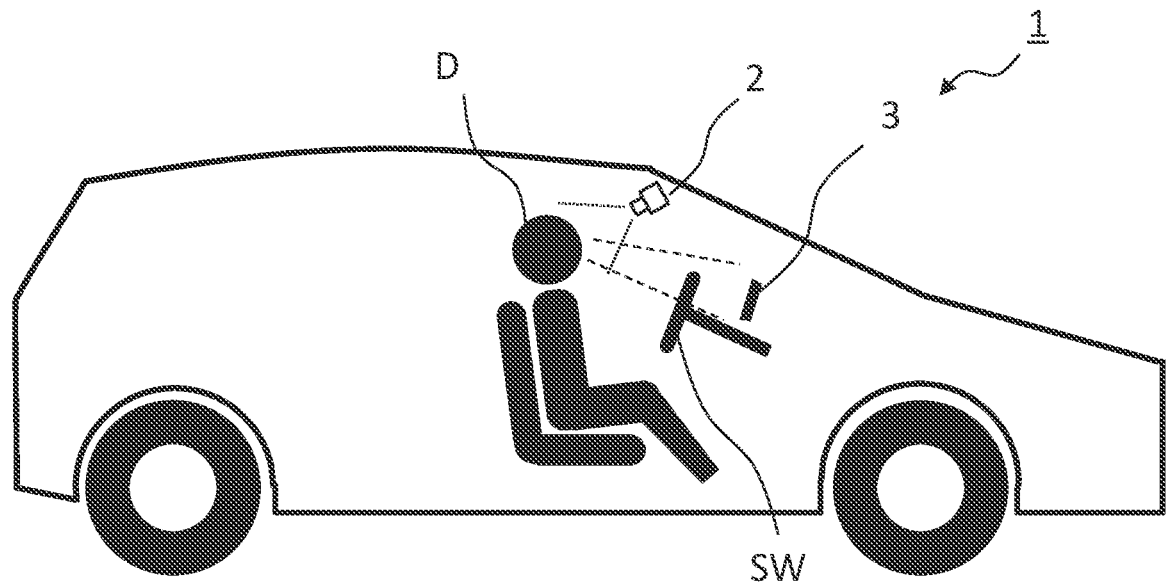
FIG. 4 illustrates an example of capture of a face image.

FIG. 4 illustrates an example of capture of a face image.

In the interior of the vehicle 1, a driver D turns his/her eyes on the touch screen display 3 disposed in front. A steering wheel SW may be disposed in the looking direction of the driver D. The driver monitoring camera 2 captures a face image showing the face of the driver D.

The state obtaining unit 531 obtains, for example, information indicating the looking direction of the driver as the facial information indicating the state of the driver's face. The looking direction is expressed as an angle, in a horizontal or vertical plane, between the travel direction of the vehicle 1 and the direction in which the driver is looking.

The state obtaining unit 531 inputs the obtained face image into a classifier that has been trained to detect the positions of pupils and images of a light source reflected on corneas, thereby identifying the positions of the pupils and images reflected on the corneas in the driver's eyes in the face image. The state obtaining unit 531 then detects the looking direction, based on the positional relationship between the pupils and the images reflected on the corneas.

The classifier may be, for example, a convolution neural network (CNN) including multiple layers connected in series from the input toward the output. A CNN that has been trained using, as training data, inputted face images including pupils and images reflected on corneas operates as a classifier to identify the positions of pupils and images reflected on corneas.

The state obtaining unit 531 may input a face image into a classifier to identify the positions of the inner canthi and the irises of the driver's eyes, and detect the looking direction, based on the positional relationship between the inner canthi and the irises. In this case, the driver monitoring camera 2 may include a highly sensitive visible-light sensor that can output an appropriate image showing the driver's face even in the nighttime in the interior of a vehicle.

The facial information may be information indicating the driver's expression. The driver's expression is expressed by facial characteristic quantities of units of facial movement detected from a face image. The state obtaining unit 531 inputs a face image into a classifier that has been trained to detect the positions of units of facial movement, such as outer canthi and corners of the mouth, thereby identifying the positions of units of facial movement included in the face image. The state obtaining unit 531 then compares the identified positions of units of facial movement with predetermined reference positions of the units of facial movement to detect the facial characteristic quantities. Each reference position may be, for example, the position of a unit of facial movement of a standard face model, or an average of the positions of a unit of facial movement detected from face images of the driver.

The facial information may be the orientation of the driver's face, which is expressed as one or more of pitch, yaw, and roll angles of the driver's head in the three-dimensional space of the interior of the vehicle. The state obtaining unit 531 inputs an obtained face image into a classifier that has been trained to detect the positions of predetermined facial parts, such as inner and outer canthi and corners of the mouth, thereby identifying the positions of the predetermined parts included in the face image. The state obtaining unit 531 then compares the positions of the predetermined parts detected from the face image with a three-dimensional model of a standard face, and detects the orientation of the face of the three-dimensional model in which the positions of respective parts best fit those of the parts detected from the face image, as the orientation of the face of the face image.

The input-screen displaying unit 532 determines whether input of information by the driver is requested. When it is determined that input of information by the driver is requested, the input-screen displaying unit 532 causes the touch screen display 3 to show a screen including an input section for receiving input of information by the driver. The input-screen displaying unit 532 determines that input of information is requested, when a request asking the driver to input information is received from another program executed by the processor 53. The input-screen displaying unit 532 also determines that input of information is requested, when a signal for requesting the driver to input information is received via the communication interface 51 from a device for processing information (not shown), such as another ECU connected to the in-vehicle network.

Figure 5:
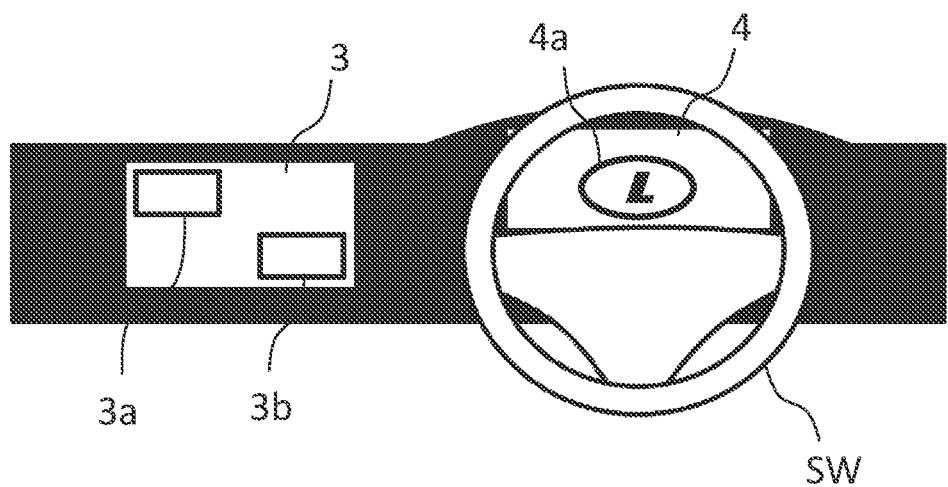
FIG. 5 illustrates an example of displaying in a displaying unit.

FIG. 5 illustrates an example of displaying in a displaying unit.

FIG. 5 schematically illustrates the field of vision of the driver sitting on the driver's seat and looking forward in the interior of the vehicle. The touch screen display 3 is disposed near the center in the left-right direction in the interior of the vehicle (left in FIG. 5). The meter display 4 is disposed in front of the driver's seat where the steering wheel SW is mounted (right in FIG. 5).

A screen including input sections 3a and 3b is displayed on the touch screen display 3. The input section 3a is disposed at one edge (the upper left) of the touch screen display 3. For example, the input section 3a is a section displaying characters according to the driver's operation on the touch screen display 3. The input section 3b is disposed at an opposite edge (the lower right) of the touch screen display 3. For example, the input section 3b is a confirmation button to be operated to finalize the characters displayed in the input section 3a as inputted characters.

A logotype 4a for guiding the driver's eyes is displayed on the meter display 4. The touch screen display 3 and the meter display 4 need not simultaneously display the input sections 3a and 3b and the logotype 4a, and display them at different times. The touch screen display 3 and the meter display 4 may display none of them for some periods. For example, the input sections 3a and 3b appear when it is determined that input of information by the driver is requested. The logotype 4a is displayed for a predetermined time (e.g., 5 seconds) after turn-on of an ignition of the vehicle 1.

The correction-information obtaining unit 533 obtains correction information from a face image, of the face images received from the driver monitoring camera 2, captured while a screen including an input section is displayed on the touch screen display 3. The correction information is information for correcting the facial information.

The correction-information obtaining unit 533 inputs the face image into a classifier that has been trained to detect the positions of pupils and images of a light source reflected on corneas, thereby identifying the positions of the pupils and images reflected on the corneas in the driver's eyes in the face image. The correction-information obtaining unit 533 then detects the difference between the looking direction of the driver's right eye and that of his/her left eye as the correction information, based on the positional relationship between the pupils and the images of the light source reflected on the corneas in the left and right eyes. The correction information indicating the difference between the looking direction of the driver's right eye and that of his/her left eye can be used for correcting the facial information that is the looking direction of the driver obtained by the state obtaining unit 531.

The correction-information obtaining unit 533 may identify the line passing through the position where the input section 3a is displayed in the touch screen display 3 and extending in the looking direction detected from a face image obtained when the input section 3a appears at one edge of the touch screen display 3. At this time, the correction-information obtaining unit 533 also identifies the line passing through the position where the input section 3b is displayed in the touch screen display 3 and extending in the looking direction detected from a face image obtained when the input section 3b appears at an opposite edge of the touch screen display 3. The correction-information obtaining unit 533 then determines the intersection point of these lines to detect the three-dimensional positions of the driver's eyes as the correction information. The correction information indicating the three-dimensional positions of the driver's eyes can be used for correcting the facial information that is the looking direction of the driver obtained by the state obtaining unit 531.

The correction-information obtaining unit 533 may input a face image into a classifier that has been trained to detect the positions of units of facial movement, such as outer canthi and corners of the mouth, thereby detecting the positions of units of facial movement included in the face image as correction information indicating the positions of units of facial movement of a blank expression. The correction information indicating the positions of units of facial movement of a blank expression can be used for correcting the facial information that is facial characteristic quantities obtained by the state obtaining unit 531.

Additionally, the correction-information obtaining unit 533 inputs the face image into a classifier that has been trained to detect the positions of pupils and images of a light source reflected on corneas, thereby identifying the positions of the pupils and images reflected on the corneas in the driver's eyes in the face image. Then, the correction-information obtaining unit 533 may detect the looking direction of the driver as the correction information, based on the positional relationship between the pupils and the images of the light source reflected on the corneas in the left and right eyes. The correction information indicating the looking direction of the driver can be used for correcting the facial information that is the orientation of the driver's face obtained by the state obtaining unit 531.

The correction information obtained by the correction-information obtaining unit 533 may be information indicating the sizes of facial parts of the driver, such as the eyes, nose, and mouth; asymmetry of characteristic points of the driver's face; or the three-dimensional position of the center of the driver's left and right pupils or irises.

The correction-information obtaining unit 533 may obtain the correction information from a face image, of the face images received from the driver monitoring camera 2, generated while the touch screen display 3 is displaying a screen including an input section and is receiving input from the driver. The correction-information obtaining unit 533 may obtain first correction information from a face image, of the face images received from the driver monitoring camera 2, generated while the touch screen display 3 is receiving input into the input section 3a from the driver and second correction information from a face image generated while the touch screen display 3 is receiving input into the input section 3b from the driver.

The correction-information obtaining unit 533 may obtain the correction information from multiple face images captured while the touch screen display 3 is receiving input into the same input section from the driver.

Figure 6:
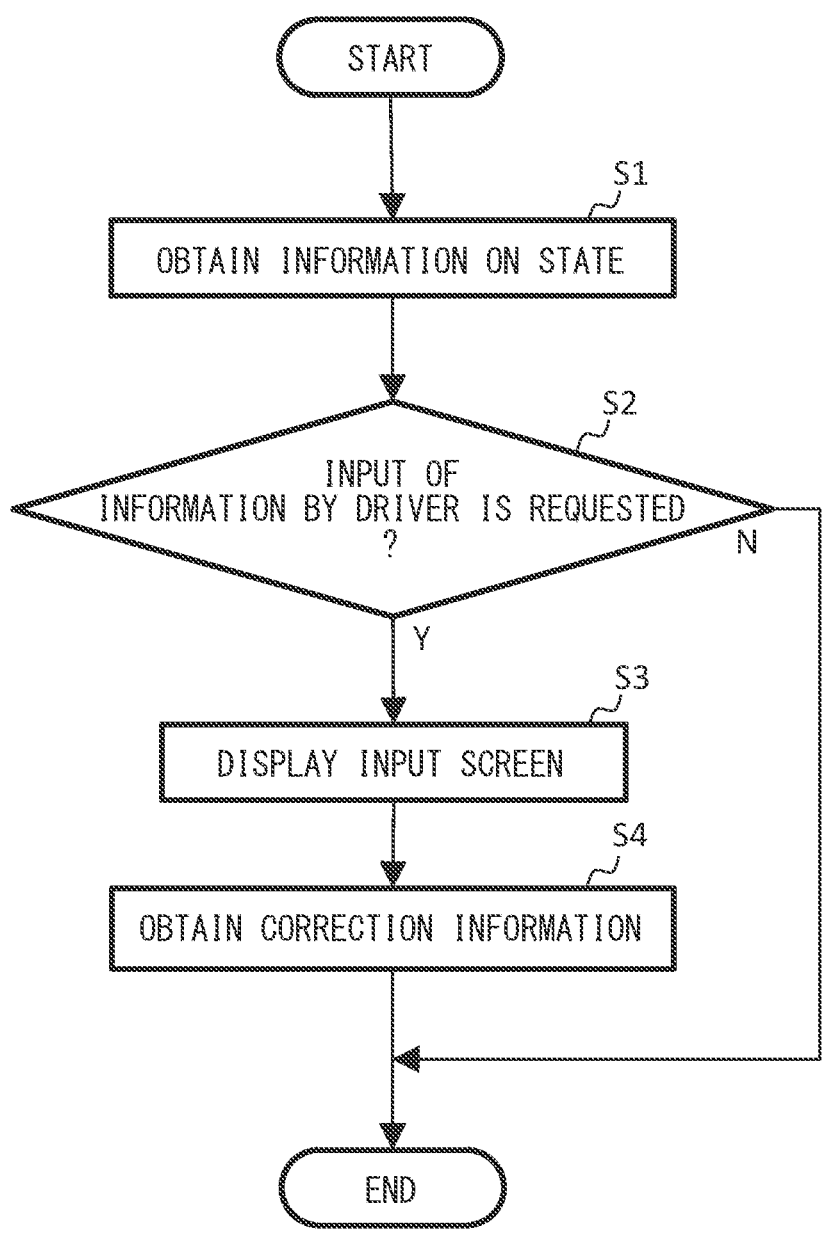
FIG. 6 is a flowchart of a facial-information obtaining process.

FIG. 6 is a flowchart of a facial-information obtaining process. The processor 53 of the apparatus 5 repeats the facial-information obtaining process at predetermined intervals during travel of the vehicle 1.

First, the state obtaining unit 531 obtains facial information indicating the state of the face of the driver of the vehicle 1 from each of face images of the driver's face (step S1).

Next, the input-screen displaying unit 532 determines whether input of information by the driver is requested (step S2). When it is determined that input of information by the driver is not requested (No in step S2), the processor 53 terminates the facial-information obtaining process.

When it is determined that input of information by the driver is requested (Yes in step S2), the input-screen displaying unit 532 causes the touch screen display 3 to show a screen including an input section for receiving input of information from the driver (step S3).

Subsequently, the correction-information obtaining unit 533 obtains correction information for correcting the facial information from a face image, of the face images, captured while the screen including the input section is displayed on the touch screen display 3 (step S4), and terminates the facial-information obtaining process.

Note that those skilled in the art can apply various changes, substitutions, and modifications without departing from the spirit and scope of the present disclosure.

What is claimed is:

1. An apparatus for obtaining facial information, comprising a processor programmed to
    display a logotype screen including a logotype on a display mounted on a vehicle for a predetermined time after turn-on of an ignition of the vehicle;
    determine that a driver requests to input information;
    in response to the driver requesting to input information, cause the display to show on the display an input screen in which an input section for receiving input of information from the driver is disposed at one edge and an opposite edge of the display; and
        obtain correction information for correcting facial information indicating a state of a face of the driver of the vehicle from each of face images of the driver's face generated while touch input is received from the driver at the input section at the one edge of the display and then at the input section at the opposite edge of the display as the input screen is displayed on the display;
    wherein the correction information comprises a three-dimensional position of the center of the driver's left and right pupils or irises, and wherein the correction information is determined by a correction-information obtaining unit that determines an intersection point of lines extending from each input section and extending in a looking direction of the driver's face;
    wherein the display is a touchscreen display and the displayed input screen comprises a section for receiving character input received from the driver touching the touchscreen display.

2. The apparatus according to claim 1, wherein the processor is programmed to
    obtain, as the correction information, first correction information from a face image generated while the input section disposed at the one edge of the display is receiving input of information from the driver and second correction information from a face image generated while the input section disposed at the opposite edge of the display is receiving input of information from the driver.

3. The apparatus according to claim 1, wherein the facial information indicates a looking direction of the driver, and
    the correction information indicates difference between a looking direction of the driver's right eye and a looking direction of the driver's left eye.

4. The apparatus according to claim 1, wherein the facial information indicates a looking direction of the driver, and
    the correction information indicates three-dimensional positions of the driver's eyes.

5. The apparatus according to claim 1, wherein the facial information indicates an expression of the driver, and
    the correction information indicates a blank expression of the driver.

6. A method for obtaining facial information, comprising:
    displaying a logotype screen including a logotype on a display mounted on a vehicle for a predetermined time after turn-on of an ignition of the vehicle;
    displaying an input screen in which an input section for receiving input of information from a driver is disposed at one edge and an opposite edge of the display;
    wherein the display is a touchscreen display and the displayed input screen comprises a section for receiving character input received from the driver touching the touchscreen display;
    obtaining correction information for correcting facial information indicating a state of a face of a driver of the vehicle from each of face images of the driver's face generated while touch input is received from the driver at the input section at the one edge of the display and then at the input section at the opposite edge of the display as the input screen is displayed on the display; and
    determining correction information that comprises a three-dimensional position of the center of the driver's left and right pupils or irises, according to an intersection point of lines extending from each input section and extending in a looking direction of the driver's face.

* * * * *